(12) United States Patent
Razin et al.

(10) Patent No.: US 12,531,058 B2
(45) Date of Patent: Jan. 20, 2026

(54) SYSTEM AND METHOD OF REINFORCING GENERAL PURPOSE NATURAL LANGUAGE MODELS WITH ACQUIRED SUBJECT MATTER

(71) Applicant: SWAMPFOX TECHNOLOGIES, INC., Columbia, SC (US)

(72) Inventors: Sergey A. Razin, Columbia, SC (US); Robert S. Cooper, Irmo, SC (US)

(73) Assignee: Swamp fox Technologies, Inc., Columbia, SC (US)

( * ) Notice: Subject to any disclaimer, the term of this patent is extended or adjusted under 35 U.S.C. 154(b) by 324 days.

(21) Appl. No.: 17/961,861

(22) Filed: Oct. 7, 2022

(65) Prior Publication Data

US 2023/0110684 A1 Apr. 13, 2023

Related U.S. Application Data

(60) Provisional application No. 63/253,763, filed on Oct. 8, 2021.

(51) Int. Cl.
| | |
|---|---|
| *G10L 15/187* | (2013.01) |
| *G06F 40/279* | (2020.01) |
| *G10L 15/06* | (2013.01) |
| *G10L 15/22* | (2006.01) |
| *H04M 3/523* | (2006.01) |
| *G10L 15/30* | (2013.01) |

(52) U.S. Cl.
CPC .......... *G10L 15/187* (2013.01); *G06F 40/279* (2020.01); *G10L 15/063* (2013.01); *G10L 15/22* (2013.01); *H04M 3/5232* (2013.01); *G10L 15/30* (2013.01)

(58) Field of Classification Search
USPC ................ 704/235, 246, 247, 251, 252, 275
See application file for complete search history.

(56) References Cited

U.S. PATENT DOCUMENTS

| | | | | |
|---|---|---|---|---|
| 7,945,445 | B1* | 5/2011 | Marschall | G10L 15/144 704/254 |
| 2004/0015356 | A1* | 1/2004 | Nakamura | G10L 15/063 704/250 |
| 2004/0098259 | A1* | 5/2004 | Niedermair | G10L 15/07 704/254 |
| 2010/0223056 | A1* | 9/2010 | Kadirkamanathan | G10L 13/08 704/E15.005 |
| 2015/0112684 | A1* | 4/2015 | Scheffer | G10L 17/14 704/257 |
| 2017/0206891 | A1* | 7/2017 | Lev-Tov | G10L 15/063 |
| 2019/0378496 | A1* | 12/2019 | Yasuda | G10L 15/06 |

* cited by examiner

*Primary Examiner* — Leonard Saint-Cyr
(74) *Attorney, Agent, or Firm* — Duquette Law Group

(57) ABSTRACT

In a contact center apparatus, a method for generating recognized text based upon verbal data, comprising: receiving verbal data from a user; applying a natural language understanding engine the verbal data to generate phonetic representation text, the phonetic representation text configured as a phonetic representation of the verbal data; applying a language reinforcement engine to the phonetic representation text to generate recognized text, the recognized text identifying a word associated with the verbal data; and directing the user to a contact center resource based upon the recognized text.

6 Claims, 5 Drawing Sheets

SYSTEM AND METHOD OF REINFORCING GENERAL PURPOSE NATURAL LANGUAGE MODELS WITH ACQUIRED SUBJECT MATTER

RELATED APPLICATIONS

This patent application claims the benefit of U.S. Provisional Application No. 63/253,763, filed on Oct. 8, 2021, entitled "System and Method of Reinforcing General Purpose Natural Language Models with Acquired Subject Matter," the contents and teachings of which are hereby incorporated by reference in their entirety.

BACKGROUND

Enterprises typically utilize contact centers to receive and distribute incoming customer omnichannel communications, such as calls, and to automate user access to the enterprise. For example, conventional contact centers can provide phone-based access to an information resource associated with the enterprise, such as an email system or database. Conventional contact centers can also route a user to a particular human resource within the enterprise, such as to a person in customer service.

SUMMARY

Following receipt of a customer's verbal communications, conventional contact centers can utilize natural language understanding engines which are configured to convert the user's speech to text. Following this speech-to-text conversion, the contact center can utilize the textual response to direct the customer to a particular resource within the enterprise, such as a database or human resource. However, conventional natural language understanding engines are typically configured with a general purpose language model to provide general purpose speech-to-text conversion. In cases where the verbal communication provided by the user speech relates to a specific subject matter, these conventional natural language understanding engines can provide inconsistent or erroneous results.

For example, conventional natural language understanding engines can have difficulty recognizing particular words, such as names having a particular regional origin. Assume the case where a user provides his name verbally to the contact center as "Robert Smith." In this case, conventional natural language understanding engines can convert the verbal response "Robert Smith" to the corresponding text, "Robert Smith." By contrast, assume the case where the user states his name as "Sergey Smith." Here, conventional natural language understanding engines might convert the verbal response to the phonetic equivalent text, "surgery Smith." In such a case, the engine would incorrectly identify the user and, as a result, can direct the user to an incorrect or unintended resource within the enterprise. Misdirection of the user can lead to a relatively poor user experience with the enterprise.

Further, conventional natural language understanding engines can have difficulty recognizing certain words associated with a particular field, such as terminology within the fields of physics or medicine. For example, assume the case where a user provides his possible malady to the contact center as "tuberculosis." In this case, conventional natural language understanding engines can convert the verbal response "tuberculosis" to the phonetic equivalent text, "tobacco assist." In such a case, the engine would incorrectly identify the user's malady and, as a result, can direct the user to an incorrect or unintended resource within the enterprise.

By contrast to conventional language understanding engines, embodiments of the present innovation relate to a system and method of reinforcing general purpose natural language models with acquired subject matter. In one arrangement, a contact center apparatus of the system can include a natural language understanding engine configured to convert verbal data received from a user to a phonetic text string. The contact center apparatus can also include a language reinforcement engine configured to utilize a phonetic model to provide word recognition of the phonetic text string. Accordingly, the language reinforcement engine is configured to refine or correct the phonetic text strings generated by the natural language understanding engine.

During operation, in response to receiving verbal data, the natural language understanding engine is configured to convert the verbal data to a phonetic representation of the data and to output the phonetic representation as phonetic representation text. The language reinforcement engine is configured to apply a phonetic model to the phonetic representation text to identify the actual text associated with the verbal data. In one arrangement, the phonetic model is trained on subject matter terms or on customer information which have been converted to a phonetic form and, as such, are subject matter dependent. For example, by applying the phonetic model for a particular subject matter to the phonetic representation text, the language reinforcement engine can identify a word or phrase associated with the verbal data specific to a particular customer or industry, and can output the word or phrase as recognized text. With utilization of the language reinforcement engine and the natural language understanding engine, the contact center apparatus can improve the quality of word recognition based on a user's verbal data and can direct the user to an appropriate resource within the enterprise, which can improve user experience.

Embodiments of the invention relate to, In a contact center apparatus, a method for generating recognized text based upon verbal data, comprising: receiving verbal data from a user; applying a natural language understanding engine the verbal data to generate phonetic representation text, the phonetic representation text configured as a phonetic representation of the verbal data; applying a language reinforcement engine to the phonetic representation text to generate recognized text, the recognized text identifying a word associated with the verbal data; and directing the user to a contact center resource based upon the recognized text.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a system and method of reinforcing general purpose natural language models with acquired subject matter. In one arrangement, a contact center apparatus of the system can include a natural language understanding engine configured to convert verbal data received from a user to a phonetic text string. The contact center apparatus can also include a language reinforcement engine configured to utilize a phonetic model to provide word recognition of the phonetic text string. As such, the language reinforcement engine is configured to refine or correct the phonetic text string generated by the natural language understanding engine.

During operation, in response to receiving verbal data, the natural language understanding engine is configured to convert the verbal data to a phonetic representation of the data and to output the phonetic representation as phonetic representation text. The language reinforcement engine is configured to apply a phonetic model to the phonetic representation text to identify the actual text associated with the verbal data. In one arrangement, the phonetic model is trained on subject matter terms or on customer information which have been converted to a phonetic form and, as such, are subject matter dependent. For example, by applying the phonetic model for a particular subject matter to the phonetic representation text, the language reinforcement engine can identify a word or phrase associated with the verbal data specific to a particular customer or industry, and can output the word or phrase as recognized text. With utilization of the language reinforcement engine and the natural language understanding engine, the contact center apparatus can improve the quality of word recognition based on a user's verbal data and can direct the user to an appropriate resource within the enterprise, which can improve user experience.

Figure 1:
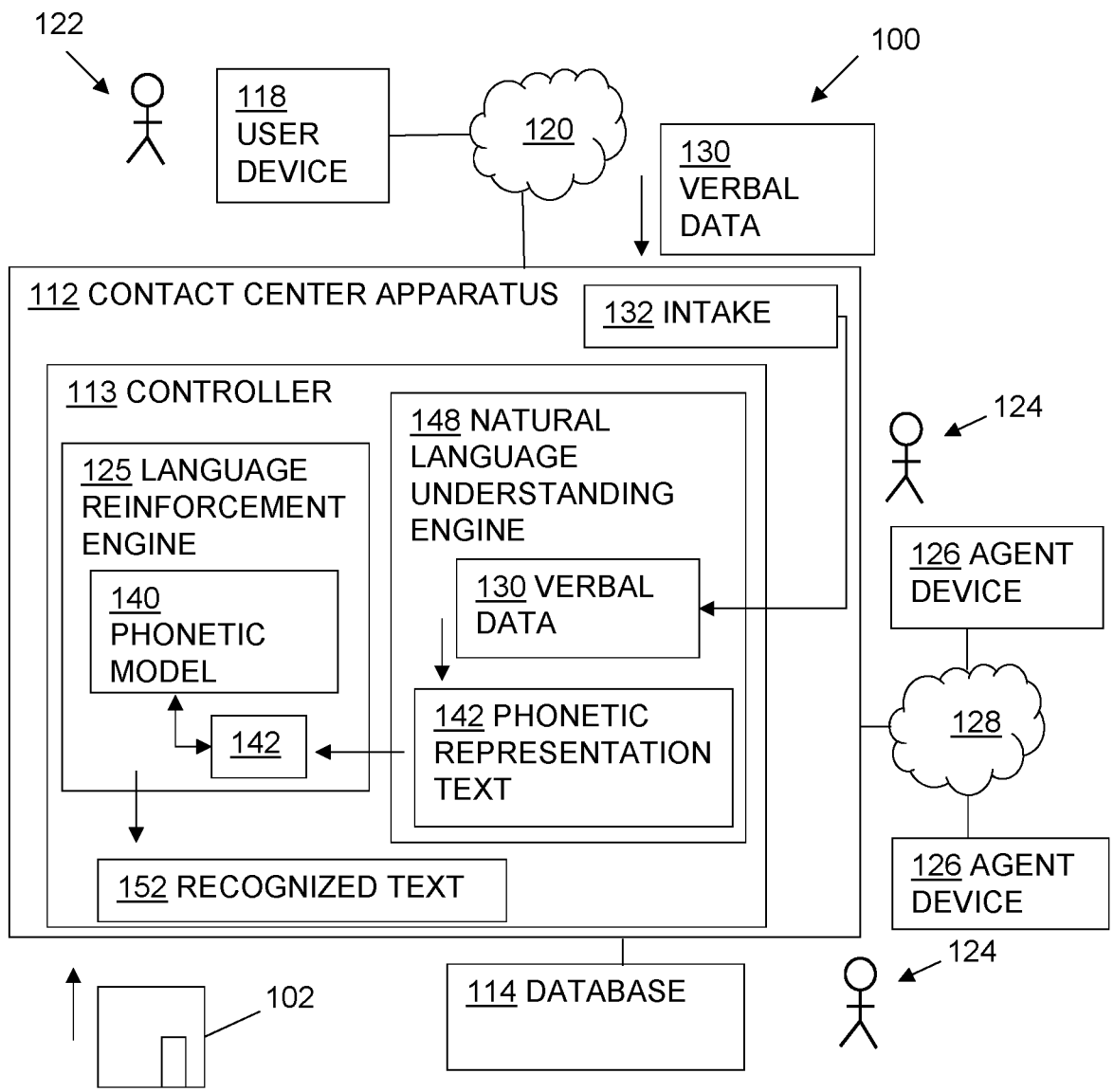
FIG. 1 illustrates a schematic representation of a contact center, according to one arrangement.

FIG. 1 illustrates a schematic representation of a contact center 100, according to one arrangement. The contact center 100 can include a contact center apparatus 112, such as a server device, disposed in electrical communication with one or more data stores or databases 114.

The contact center apparatus 112 can be a computerized device having a controller 113, such as a processor and memory. According to one arrangement, the contact center apparatus 112 is disposed in electrical communication with a user device 118, such as a telephone, smartphone, or tablet device, via a network 120, such as a local area network (LAN), a wide area network (WAN), or a public switched telephone network (PSTN). The contact center apparatus 112 can be configured to store information regarding the user in the database 114. For example, the contact center apparatus 112 can store user-related information for each communication session, such as speech, text, facial recognition, and/or GPS information. In another example, the contact center apparatus 112 can store other information related to the user 122, such as CRM data, billing data, help desk data, service data, social media data, and/or demographics data.

The contact center apparatus 112 can include a verbal intake mechanism 132 to handle an enterprise's remote customer interactions with minimal, if any, human intervention. For example, the verbal intake mechanism 132 can be configured as an Interactive Voice Response (IVR) system or as a chatbot. During operation, the verbal intake mechanism 132 can receive verbal data 130 (e.g., audio or spoken word data) from a user 122 and can provide the verbal data 130 to the controller 113 of the contact center apparatus 112.

The controller 113 of the contact center apparatus 112 is configured to execute a natural language understanding engine 148 to convert the verbal data 130 to a phonetic text string. In one arrangement, with execution of the natural language understanding engine 148, the contact center apparatus 112 can identify a phonetic representation of the user's verbal data 130 and can generate phonetic representation text 142 corresponding to the verbal data 130 for further processing by a language reinforcement engine 125.

The natural language understanding engine 148 is configured with a general purpose language model to provide general purpose speech-to-text conversion as a general purpose natural language understanding engine 148. As such, in certain cases, the phonetic representation text 142 extracted or converted from the verbal data 130 by the natural language understanding engine 148 can be inaccurate. For example, the verbal data 130 can include names or terms from a particular field (e.g., physics, medicine, etc.) which fall outside of the general purpose language model, thereby causing the natural language understanding engine 148 to generate inaccurate speech-to-text conversion results.

The controller 113 of the contact center apparatus 112 is also configured to execute a language reinforcement engine 125 to correct errors in or refine the phonetic representation text 142, as generated by the natural language understanding engine 148, by converting the phonetic representation text 142 into recognized text 152. In one arrangement, language reinforcement engine 125 can include a phonetic model 140 which has been trained or reinforced on subject matter terms or on customer information which have been converted to a phonetic form and, as such, is subject-matter dependent.

Figure 2:
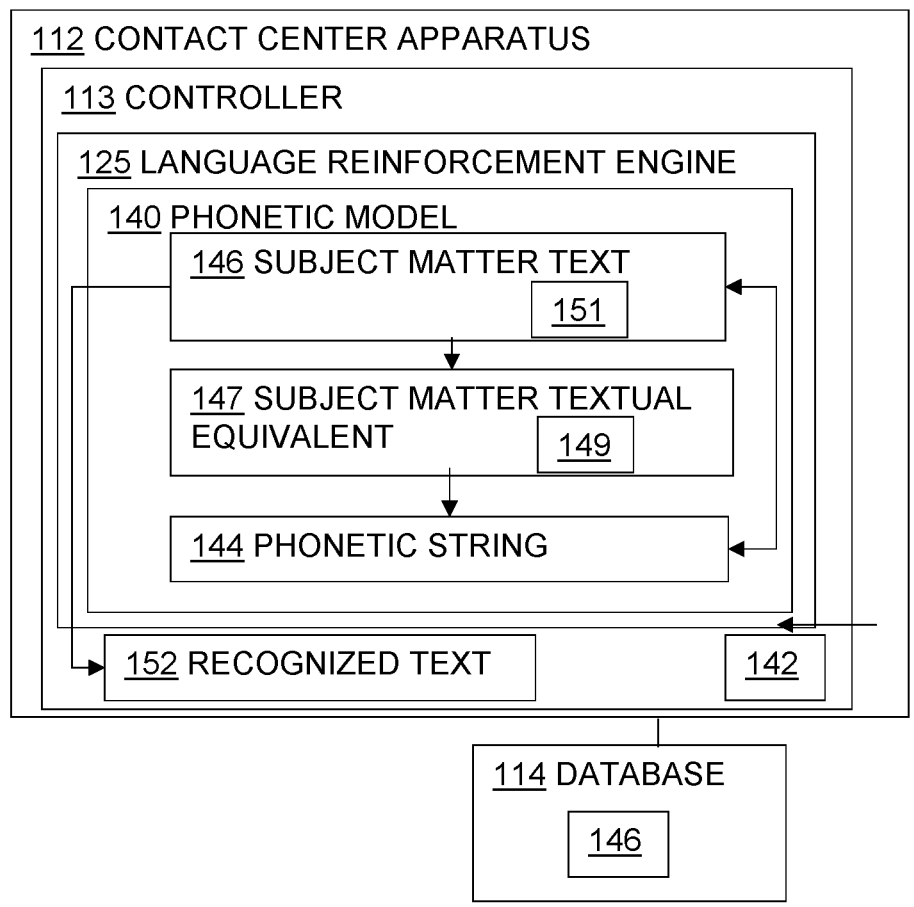
FIG. 2 illustrates a schematic representation of a language reinforcement engine of the contact center apparatus of FIG. 1, according to one arrangement.

For example, with reference to FIG. 2, the contact center apparatus 112 can train or reinforce the phonetic model 140 on subject matter text 146, such as all customer names, stored in the database 114, including first and last names. In one arrangement, during the training process, the language reinforcement engine 125 can retrieve subject matter text 146 from the database 114 and convert the subject matter text 146 into a phonetic string 144.

For example, assume the database 114 includes the name "Sergey Smith" as subject matter text 146. During training and following retrieval of "Sergey Smith" as the subject matter text 146, the language reinforcement engine 125 can utilize a variety of phonetic modeling techniques associated with the phonetic model 140, such as Levenshtein distance, to identify a subject matter textual equivalent 147 that has a phonetic attribute 149 related to a phonetic attribute 151 of the subject matter text 146. For example, the language reinforcement engine 125 can apply the phonetic model 140 to the subject matter text 146 "Sergey" to identify the word "surgery" as having the phonetic attribute 149 which is phonetically similar to the phonetic attribute 151 of the subject matter text 146. As such, the language reinforcement engine 125 can define the word "surgery" as being the subject matter textual equivalent 147 to the subject matter text 146 "Sergey."

Following generation of the subject matter textual equivalent 147, the language reinforcement engine 125 convert the subject matter textual equivalent 147 into the phonetic string 144, such as by applying the phonetic model 140 to the subject matter textual equivalent 147. For example, by applying the phonetic model 140 to the subject matter textual equivalent 147 "surgery," the language reinforcement engine 125 can train the phonetic model 140 to recognize the phonetic string 144 "sUHR-juh-ree" as equivalent to the name "Sergey." As such, the phonetic model 140 can provide a link between the phonetic string 144 "sUHR-juh-ree" and the subject matter text 146 "Sergey."

Accordingly, during operation, the language reinforcement engine 125 utilizes the phonetic model 140 to identify a word or phrase associated with the phonetic representation text 142 and to output the identified word or phrase (e.g., the subject matter text 146) as recognized text 152.

With utilization of the natural language understanding engine 148 and the language reinforcement engine 125, the contact center apparatus 112 can improve the quality of recognition of the user's verbal data 130. As such, the contact center apparatus 112 can efficiently direct the user 122 of the user device 118 to an appropriate resource or working agent 124 within the enterprise for service. For example, each working agent 124 within the contact center 100 can operate a corresponding agent device 126, such as a personal computer, telephone, tablet device or other type of voice communications equipment interconnected by a network 128, such as a LAN or WAN.

In one arrangement, the controller 113 of the contact center apparatus 112 can store an application for generating recognized text 152 based upon verbal data 130. The application installs on the controller 113 from a computer program product 102. In some arrangements, the computer program product 102 is available in a standard off-the-shelf form such as a shrink wrap package (e.g., CD-ROMs, diskettes, tapes, etc.). In other arrangements, the computer program product 102 is available in a different form, such downloadable online media. When performed on controller 113 of the contact center apparatus 112, the application causes the contact center apparatus 112 to generate recognized text which identifies a word associated with the verbal data and to direct a user to a contact center resource based upon the recognized text.

Figure 3:
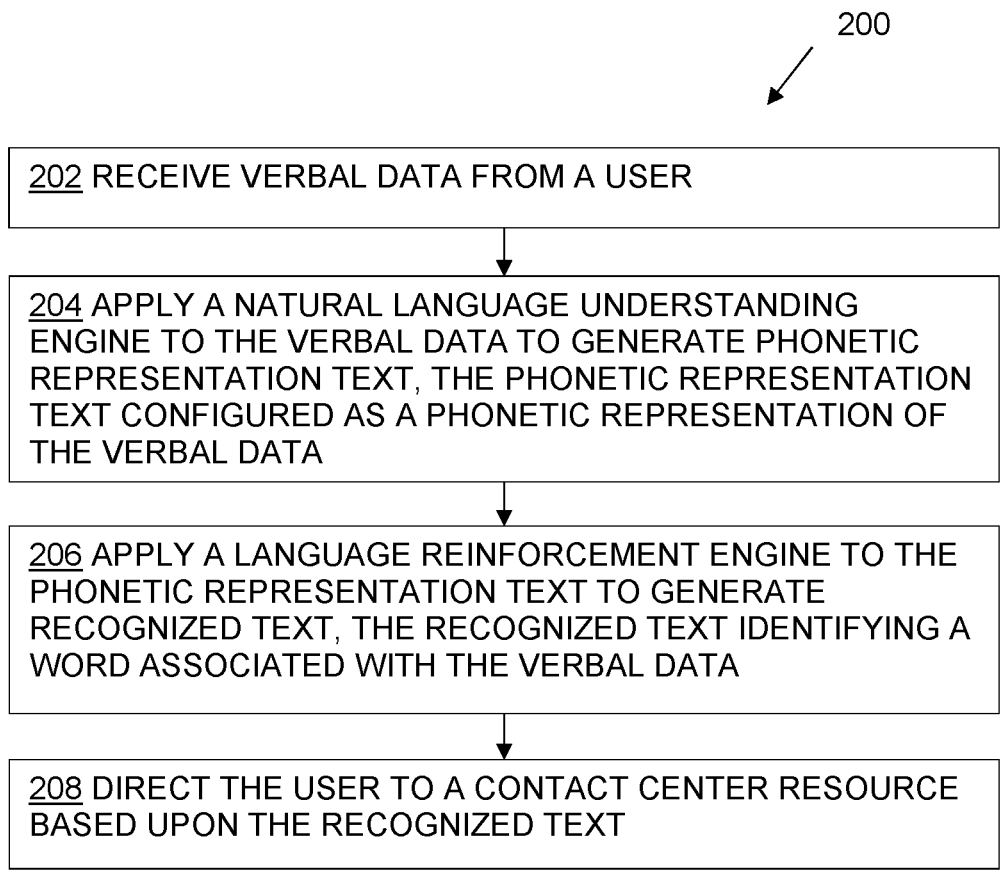
FIG. 3 illustrates a flowchart showing a process performed by a contact center apparatus of the contact center of FIG. 1, according to one arrangement.

FIG. 3 illustrates a flowchart 200 of a process performed by the contact center apparatus 112 when executing the natural language understanding engine 148 and the language reinforcement engine 125 to generate recognized text 152 based upon verbal data 130.

In element 202, the contact center apparatus 112 receives verbal data 130 from a user 122, such as via a verbal intake mechanism 132, such as an Interactive Voice Response (IVR) system. For example, with reference to FIG. 1, when the user 122 calls in to the contact center 100, the verbal intake mechanism 132 can request that the user 122 provide certain information, such as the user's name or address. In response to the request, in one arrangement, the user 122 can provide a verbal response to the verbal intake mechanism 132, which the verbal intake mechanism 132 provides to the contact center apparatus 112 as verbal data 130. In one arrangement, in response to the request, the user 122 can provide a text string to the verbal intake mechanism 132 which, in turn, provides as the verbal data 130 to the contact center apparatus 112.

Returning to FIG. 3, in element 204, the contact center apparatus 112 applies a natural language understanding engine 148 to the verbal data 130 to generate phonetic representation text 142, the phonetic representation text 142 configured as a phonetic representation of the verbal data 130. In one arrangement, when applying the natural language understanding engine 148 to the verbal data 130, the contact center apparatus 112 utilizes the natural language understanding engine 148 to convert the verbal data 130 to phonetic representation text 142 which is a phonetic representation of the verbal data 130.

As provided above, the natural language understanding engine 148 is configured as a general purpose natural language understanding engine 148 which provides general purpose speech-to-text conversion. Accordingly, the natural language understanding engine 148 is configured to convert speech-to-text for a number of words in a relatively accurate manner. As such, the natural language understanding engine 148 can convert the name "Smith" within the verbal data 130 to the text "Smith," as part of the phonetic representation text 142.

However, for particular names or terms from a particular field (e.g., physics, medicine, etc.), the natural language understanding engine 148 to generate inaccurate speech-to-text conversion results. For example, assume the case where the verbal data 130 identifies the user's name as "Sergey Smith." Based upon the application of the natural language understanding engine 148 to this verbal data 130, assume the case where the natural language understanding engine 148 identifies the verbal input "Sergey" as sounding phonetically the same as "sUHR-juh-ree" (i.e., the word "surgery"). Based upon such identification, the natural language understanding engine 148 can generate the phrase "sUHR-juh-ree Smith" as the phonetic representation text 142 corresponding to the verbal data 130 "Sergey Smith." As such the speech-to-text conversion results, as generated by the natural language understanding engine 148 and as included as part of the phonetic representation text 142, are inaccurate.

In element 206, the contact center apparatus 112 applies a language reinforcement engine 125 to the phonetic representation text 142 to generate recognized text 152, the recognized text 152 identifying a word associated with the verbal data 130. In one arrangement, to generate the recognized text 152, the contact center apparatus 112 is configured to execute the language reinforcement engine 125 to compare the phonetic representation text 142 to a phonetic model 140.

In one arrangement, with reference to FIG. 2, following receipt of the phonetic representation text 142 from the natural language understanding engine 148, the language reinforcement engine 125 applies the phonetic representation text 142 to the phonetic model 140.

For example, assume the case where the language reinforcement engine 125 receives "sUHR-juh-ree Smith" as the phonetic representation text 142. As the language reinforcement engine 125 applies the phonetic model 140 to the phonetic representation text 142, the phonetic model 140 can compare the phonetic representation text 142 to each phonetic string 144 generated during the training process. In the case where a phonetic string 144 of the phonetic model 140 includes the phrase "sUHR-juh-ree Smith," following a comparison of the phonetic representation text 142, "sUHR-juh-ree Smith" in this case, with the phonetic string 144, the language reinforcement engine 125 can detect a match between the phonetic representation text 142 and the phonetic string 144. Based upon this match, the language reinforcement engine 125 can identify the subject matter text 146 associated with the phonetic string 144. For example, as provided above, during the training process, the phonetic model 140 is configured to provide a link between the phonetic string 144 and the subject matter text 146. Accordingly, based upon identification of the phonetic string 144 "sUHR-juh-ree Smith" as part of the phonetic model 140, the language reinforcement engine 125 can identify the corresponding, or linked subject matter text 146 "Sergey Smith" as provided by the phonetic model 140.

Therefore, when the language reinforcement engine 125 receives "sUHR-juh-ree Smith" as the phonetic representation text 142, application of the phonetic representation text 142 to the phonetic model 140 by the language reinforcement engine 125 can result in identification of the customer name "Sergey Smith" as the associated subject matter text 146. As a result, the language reinforcement engine 125 can generate the recognized text 152 as including the subject matter text 146, namely the phrase "Sergey Smith," as the recognized text 152. As such, the recognized text 152 accurately identifies the word or phrase associated with the verbal data 130 received by the contact center apparatus 112.

Returning to FIG. 3, in element 208, the contact center apparatus 112 directs the user 122 to a contact center resource based upon the recognized text 152. For example, the contact center apparatus 112 can provide the recognized text 152 back to the verbal intake mechanism 132. In response to identifying the user 122 as Sergey Smith based upon the recognized text 152, the verbal intake mechanism 132 can forward the user 122 to a particular resource within the enterprise, such as a database, or to a particular agent 124 who is responsible for Sergey Smith's account.

Accordingly, application of the natural language understanding engine 148 and language reinforcement engine 125 to the verbal data 130 received from a user 122 allows the contact center apparatus 112 to correctly identify the content of the verbal data 130 provided by the user 122, particularly in the case where the user's audio response relates to subject matter that is relatively personalized (e.g., a name, industry-specific terminology, etc.). As such, the contact center 112 can efficiently direct the user 122 to the appropriate service associated with the enterprise associated with the contact center 100, thereby improving the user's experience when engaging with the contact center system 100.

Figure 4:
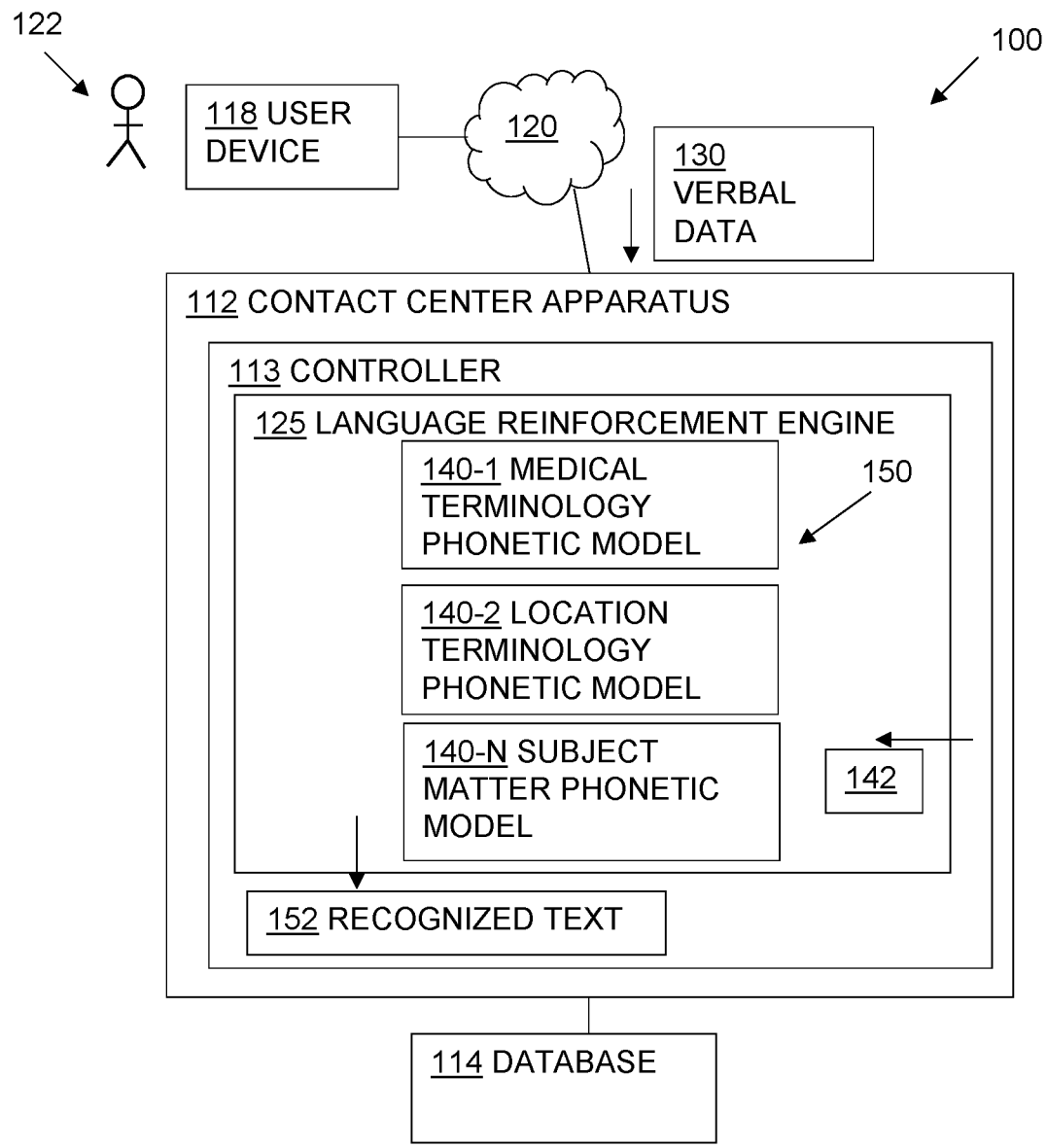
FIG. 4 illustrates a schematic representation of the contact center of FIG. 1 having a plurality of phonetic models, according to one arrangement.

As described above, the language reinforcement engine 125 includes a phonetic model 140 trained on all customer names stored in the database 114 and configured to provide a transcription of phonetic representation text 142 of the customer names to natural language text 152. Such description is by way of example only. As illustrated in FIG. 4, the language reinforcement engine 125 can include a plurality or set of phonetic models 150, each of which is trained on a particular type of information or subject matter stored by the contact center 100 as part of the database 114. In one arrangement, a first phonetic model 140-1 can be trained by the contact center apparatus 112 on medical terminology such as stored in the database 114. As such, the phonetic model 140-1 is configured to correct phonetic representation text 142 relating to medical terminology.

In one arrangement, a second phonetic model 140-2 can be trained by the contact center apparatus 112 on map or location terminology stored in the database 114. As such, the phonetic model 140-1 is configured to correct phonetic representation text 142 relating to phonetic addresses or locations.

Further, additional phonetic models 140-N can be trained by the contact center apparatus 112 on additional types of subject matter utilized by the contact center 100 and its customers and such as stored in the database 114. For example, the contact center apparatus 112 can train the phonetic models 140-N on particular contact-center based terminology or on terminology associated with the customer's area of expertise, such as manufacturing terminology.

In one arrangement, the language reinforcement engine 125 of the contact center apparatus 112 can be preconfigured to execute a phonetic model 140 of the set of phonetic models 150 based upon the type of subject matter expected to be received as verbal data 130 from the user.

In one arrangement, the contact center 100 can be associated with a hospital or health care facility. As such, the language reinforcement engine 125 can be preconfigured to execute the medical terminology phonetic model 140-1 to identify medical terminology associated with the verbal data 130. For example, during operation, assume the case where the verbal data 130 includes the medical term "surgery." Further assume that the natural language understanding engine 140 generates phonetic representation text 142 that identifies the verbal data 130 "surgery" as the phrase "sun Jerry," an inaccurate speech-to-text conversion phonetic equivalent. With the language reinforcement engine 125 being preconfigured to execute the medical terminology phonetic model 140-1, the language reinforcement engine 125 can apply the phonetic representation text 142 to the medical term phonetic model 140-1. As a result of the application of the model 140-1, the language reinforcement engine 125 can identify the phrase "sun Jerry" as being equivalent to the term "surgery" and can generate the phrase "surgery" as the recognized text 152.

In one arrangement, the contact center 100 can be associated with a client intake department of an enterprise facility. As such, the language reinforcement engine 125 can be preconfigured to execute the location terminology phonetic model 140-2 to identify a user address associated with the verbal data 130. For example, during operation, assume the case where the verbal data 130 includes the address "123 Windsong Ln, Brevard, NC". Further assume that the natural language understanding engine 140 generates phonetic representation text 142 that identifies the verbal data 130 as "123 Wind soft Ln, Brevard, NC," an inaccurate speech-to-text conversion phonetic equivalent. With the language reinforcement engine 125 being preconfigured to execute the location terminology phonetic model 140-2, the language reinforcement engine 125 can apply the phonetic representation text 142 to location terminology phonetic model 140-2. As a result of the application of the model 140-2, the language reinforcement engine 125 can identify the phrase "Wind soft" in the address as being equivalent to the term "Windsong" and can generate the phrase "123 Windsong Ln, Brevard, NC" as the recognized text 152.

Figure 5:
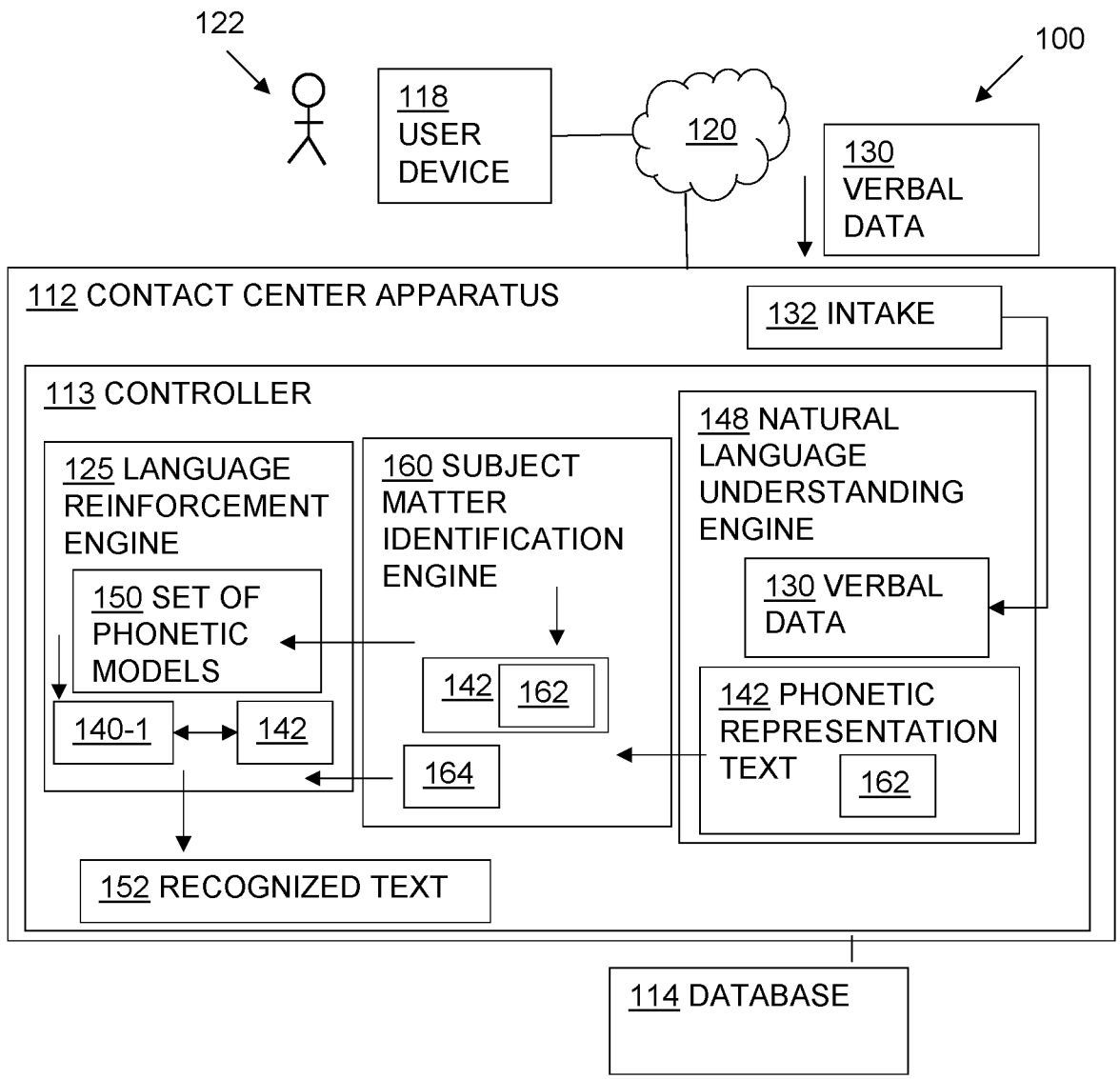
FIG. 5 illustrates a schematic representation of the contact center of FIG. 1 having a subject matter identification engine, according to one arrangement.

In one arrangement, the contact center apparatus 112 can be configured to select and utilize one or more phonetic models 140 based upon the subject matter of the verbal data 130 received from the user 122 (e.g., name, medical terminology, address, etc.). For example, with reference to FIG. 5, the contact center apparatus 112 can include a subject matter identification engine 160 disposed between the natural language understanding engine 149 and the language reinforcement engine 148. The subject matter identification engine 160 is configured to select a phonetic model 140 of a set or plurality of phonetic models 150 to process the phonetic representation text 142 received from the natural language understanding engine 148.

The subject matter identification engine 160 can configured to select a phonetic model 140 of a set or plurality of phonetic models 150 in a variety of ways. In one arrangement, the subject matter identification engine 160 is configured to identify a context attribute 162 of the phonetic representation text 142 and to select a phonetic model 140 based upon the context attribute 162.

For example, during operation, assume the case where a verbal intake mechanism 132 associated with the contact center apparatus 112 requests the user 122 provide the name of the department he would like to contact. In response, assume the user responds "I would like the tuberculosis diagnosis department" and that the verbal intake mechanism 132 provides this response to the natural language understanding engine 148 as verbal data 130. Further assume that the natural language understanding engine 148 converts the verbal data 130 to the textual equivalent of "I would like the tobacco assist diagnosis department" and provides this textual equivalent to the subject matter identification engine 160 as phonetic representation text 142.

Following receipt of the phonetic representation text 142, the subject matter identification engine 160 reviews the phonetic representation text 142 for a subject matter context attribute 162, such as words within the phonetic representation text 142 which provide context to the message. For example, as the subject matter identification engine 160 reviews the phrase "I would like the tobacco assist diagnosis department," based upon its training the engine 160 can identify the words "diagnosis department" as the subject matter context attribute 162 (i.e., identifying the phonetic representation text 142 as relating to the field of healthcare). In response to identifying the subject matter context attribute 162, the subject matter identification engine 160 can transmit the phonetic representation text 142 and a subject matter message 164 to the language reinforcement engine 125. The subject matter message 164 is configured to identify the subject matter of the phonetic representation text 142 (e.g., "the subject matter is healthcare").

In response to receiving the subject matter message 164, the language reinforcement engine 125 is configured to select a phonetic model 140 from the set of phonetic models 150 corresponding to the subject matter message 164. The language reinforcement engine 125 is then configured to apply the selected phonetic model 140 to the phonetic representation text 142 to generate the recognized text 152. For example, following receipt of the subject matter message 164 identifying the subject matter as "healthcare," the language reinforcement engine 125 can select the medical terminology phonetic model 140-1 from the set of phonetic models 150. Further, in applying the medical terminology phonetic model 140-1 to the phonetic representation text 142, the language reinforcement engine 125 can correct or refine the text 142 from "I would like the tobacco assist diagnosis department" to "I would like the tuberculosis diagnosis department." With this corrected phrase as the recognized text 152, the contact center apparatus 112 can direct the user to the appropriate department or agent 124. Accordingly, the use of the subject matter identification engine 160 to allow for the selection of a particular phonetic model 140 by the language reinforcement engine 125 can improve the quality of recognition of the verbal data 130 provided by a user 122.

While various embodiments of the innovation have been particularly shown and described, it will be understood by those skilled in the art that various changes in form and details may be made therein without departing from the spirit and scope of the innovation as defined by the appended claims.

What is claimed is:

1. In a contact center apparatus, a method for generating recognized text based upon verbal data, comprising:
   receiving verbal data from a user;
   applying a natural language understanding engine the verbal data to generate phonetic representation text, the natural language understanding engine configured with a general purpose language model and the phonetic representation text configured as a phonetic representation of the verbal data;
   applying a language reinforcement engine to the phonetic representation text to generate recognized text, the recognized text identifying a word associated with the verbal data; and
   directing the user to a contact center resource based upon the recognized text;
   wherein applying the language reinforcement engine to the phonetic representation text to generate recognized text comprises:
   identifying a subject matter context attribute associated with the phonetic representation text;
   selecting a phonetic model from a set of phonetic models based upon the identified subject matter context attribute;
   applying the selected phonetic model of the set of phonetic models of the language reinforcement engine to the phonetic representation text; and
   in response to detecting a match between a phonetic string of the selected phonetic model and the phonetic representation text:
   identifying subject matter text associated with the phonetic string, and
   generating the recognized text, the recognized text comprising the subject matter text and the recognized text identifying the word associated with the verbal data.

2. The method of claim 1, comprising training the phonetic model of the language reinforcement engine on subject matter text to generate a phonetic string.

3. The method of claim 2, wherein training the phonetic model of the language reinforcement engine on subject matter text to generate the phonetic string comprises:
   receiving the subject matter text;
   identifying a subject matter textual equivalent to the subject matter text, the subject matter textual equivalent having a phonetic similarity attribute related to a phonetic attribute of the subject matter text; and
   converting the subject matter textual equivalent into the phonetic string.

4. A contact center apparatus, comprising:
   a controller having a memory and a processor, the controller configured to:
   receive verbal data from a user;
   apply a natural language understanding engine the verbal data to generate phonetic representation text, the natural language understanding engine configured with a general purpose language model and the phonetic representation text configured as a phonetic representation of the verbal data;
   apply a language reinforcement engine to the phonetic representation text to generate recognized text, the recognized text identifying a word associated with the verbal data; and
   direct the user to a contact center resource based upon the recognized text,
   wherein when applying the language reinforcement engine to the phonetic representation text to generate recognized text, the controller is configured to:
   identify a subject matter context attribute associated with the phonetic representation text;
   select a phonetic model from a set of phonetic models based upon the identified subject matter context attribute;

apply the selected phonetic model of the set of phonetic models of the language reinforcement engine to the phonetic representation text; and in response to detecting a match between a phonetic string of the selected phonetic model and the phonetic representation text:
  identify subject matter text associated with the phonetic string, and
  generate the recognized text, the recognized text comprising the subject matter text and the recognized text identifying the word associated with the verbal data.

5. The contact center apparatus of claim 4, wherein the controller is configured to train the phonetic model of the language reinforcement engine on subject matter text to generate a phonetic string.

6. The contact center apparatus of claim 5, wherein when training the phonetic model of the language reinforcement engine on subject matter text to generate the phonetic string the controller is configured to:
  receive the subject matter text;
  identify a subject matter textual equivalent to the subject matter text, the subject matter textual equivalent having a phonetic similarity attribute related to a phonetic attribute of the subject matter text; and
  convert the subject matter textual equivalent into the phonetic string.

* * * * *